United States Patent [19]
Snyder et al.

[11] Patent Number: 4,625,764
[45] Date of Patent: Dec. 2, 1986

[54] RELAY VALVE

[75] Inventors: David E. Snyder, Longview; Norman L. Gundel, Dallas, both of Tex.

[73] Assignee: Axelson, Inc., Longview, Tex.

[21] Appl. No.: 847,642

[22] Filed: Apr. 3, 1986

[51] Int. Cl.⁴ .................................................... F15B 13/042
[52] U.S. Cl. ........................... 137/625.66; 137/625.6; 251/63.4
[58] Field of Search ................. 137/625.6, 625.66; 251/63.4

[56] References Cited

U.S. PATENT DOCUMENTS

| Re. 31,845 | 3/1985 | Peters | 137/625.66 X |
|---|---|---|---|
| 3,877,484 | 4/1975 | Theriot et al. | 137/625.66 |
| 4,073,466 | 2/1978 | Snyder | 137/625.66 X |
| 4,145,025 | 3/1979 | Bergeron | 137/625.66 X |
| 4,239,058 | 12/1980 | Peters | 137/625.66 X |
| 4,320,779 | 3/1982 | Peters | 137/625.66 X |
| 4,355,658 | 10/1982 | Snyder | 137/625.66 X |
| 4,364,412 | 12/1982 | Peters | 137/625.66 X |

Primary Examiner—Gerald A. Michalsky
Attorney, Agent, or Firm—Hubbard, Thurman, Turner & Tucker

[57] ABSTRACT

Disclosed is a relay valve having a valve body with a longitudinal bore having axially spaced apart along its length and extending into the valve bore an inlet, and outlet, an exhaust, and a pilot inlet. A valve stem is slidingly mounted in the valve bore and is movable between a first position in which the inlet is in communication with the outlet and communication from the outlet to the exhaust is blocked, and a second position in which the outlet is in communication with the exhaust and communication from the inlet to the outlet is blocked. A piston is slidingly mounted in the valve bore and is movable with respect to the valve stem. The piston has a longitudinal piston bore and a piston spring is provided for urging the piston toward a closed end of the valve bore. A spool is connected to the stem and is slidingly positioned in the piston bore. The spool is movable with respect to the piston between an open position in which a chamber defined between the piston and the closed end of the bore is in communication with the exhaust and a closed position in which communication between the chamber and the exhaust is blocked and the pilot inlet is in communication with the chamber. A spool spring is provided for urging the spool toward the open position.

18 Claims, 4 Drawing Figures

RELAY VALVE

BACKGROUND OF THE INVENTION

A. Field of the Invention

The present invention relates to manually operated relay valves of the type used in fluid control systems such as safety systems for oil and gas wells, and more particularly to a relay valve that is relatively easily manually operable to shut in the system and that must be manually returned to service after the system has been shut in.

B. Description of the Prior Art

Safety systems for shutting in oil and gas well production lines and other flow lines in the event of unusually high or low pressure conditions are well known. Such systems include a pneumatically or hydraulically actuated safety valve for controlling the fluid flow in the line and sensors or pilot valves for sensing pressure in the flow line and producing a signal when the flow line pressure varies from its intended operating range. The systems include a relay valve which receives pressure from the sensors and supplies fluid pressure to the safety valve actuator. When the sensors signal an abnormal flow line pressure, the relay valve operates to vent the safety valve actuator and allow the safety valve to close. Relay valves typically include some means for preventing the relay from going back into service after it has operated to shut in the safety valve. The preventing means may be either external, as shown for example in McMullan U.S. Pat. No. 3,823,739, or internal, as shown for example in Theriot, et al. U.S. Pat. Nos. 3,877,484, or 3,963,050.

A primary shortcoming of the relay valves of the prior art lies in their capacity to be shut in manually. Relay valves include a relatively large diameter pilot piston that is acted upon by pilot pressure to maintain the relay in its in-service position. If the operator desires to shut in the system manually, he must exert a closing force on the relay equal to the pilot pressure multiplied by the area of the pilot piston. Since the safety valve actuator systems operate at relatively high pressures, it has been necessary in the past to regulate and reduce pilot pressure so that the operator can manually shut in the relay. Regulating the pilot pressure has added complexity to the system and has added a source of system failure.

It is therefore an object of the present invention to provide a relay valve that overcomes the shortcomings of the prior art. More particularly, it is an object of the present invention to provide a relay valve that may be manually shut in over a greater range of pilot pressures than was heretofore available. It is a further object of the present invention to provide a relay valve that operates more rapidly to shut in the system in response to a drop in pilot pressure.

SUMMARY OF THE INVENTION

Briefly stated, the foregoing and other objects are accomplished by the relay valve of the present invention, which includes a valve body with a longitudinal bore having axially spaced apart along its length an inlet, an outlet, an exhaust, and a pilot inlet. A valve stem is slidingly mounted in the valve bore and is movable between a first or in-service position in which the inlet is in communication with the outlet and communication from the outlet to the exhaust is blocked, and a second, shut in or normal, position in which the outlet is in communication with the exhaust and communication from the exhaust and communication from the inlet to the outlet is blocked.

A piston is slidingly mounted in the valve bore and is movable with respect to the stem. The piston has a longitudinal piston bore and defines a chamber in the valve bore between the piston and a closed end of the valve bore. A piston spring is provided for urging the piston toward the closed end of the valve bore.

A spool is connected to the stem and slidingly positioned in the piston bore. The spool is movable with respect to the piston bore between an open position in which the chamber is in communication with the exhaust and communication between the pilot inlet and the chamber is blocked, and a closed position in which communication between the chamber and exhaust is blocked and the pilot inlet is in communication with the chamber. A spool spring is provided for urging the spool toward its open position. Thus, when the spool is in the closed position, pressure within the chamber acts on the spool and piston to move the stem to or maintain the stem in the first or in-service position. When the spool is in the open position, pressure in the chamber vents to the exhaust and allows the piston and spool to move toward the closed end of the valve bore, which in turn causes the stem to move to the second, shut in or normal, position. Also, when the spool is in the second position, the pilot inlet is isolated from the chamber so that pilot pressure cannot return the stem to the in-service position unless the spool is manually closed. The stem may be manually operated to move from the first position to the second position by manually opening the spool.

DESCRIPTION OF THE PREFERRED EMBODIMENT

Figure 1:
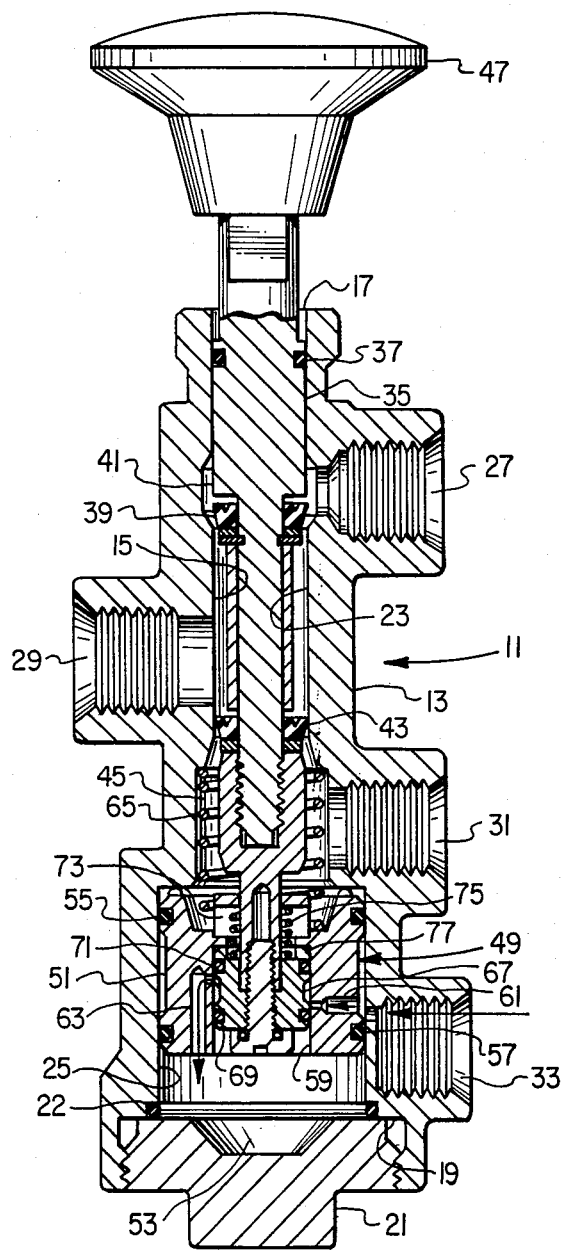
FIG. 1 is a longitudinal sectional view of the preferred embodiment of the relay valve of the present invention in the in-service position.
Figure 2:
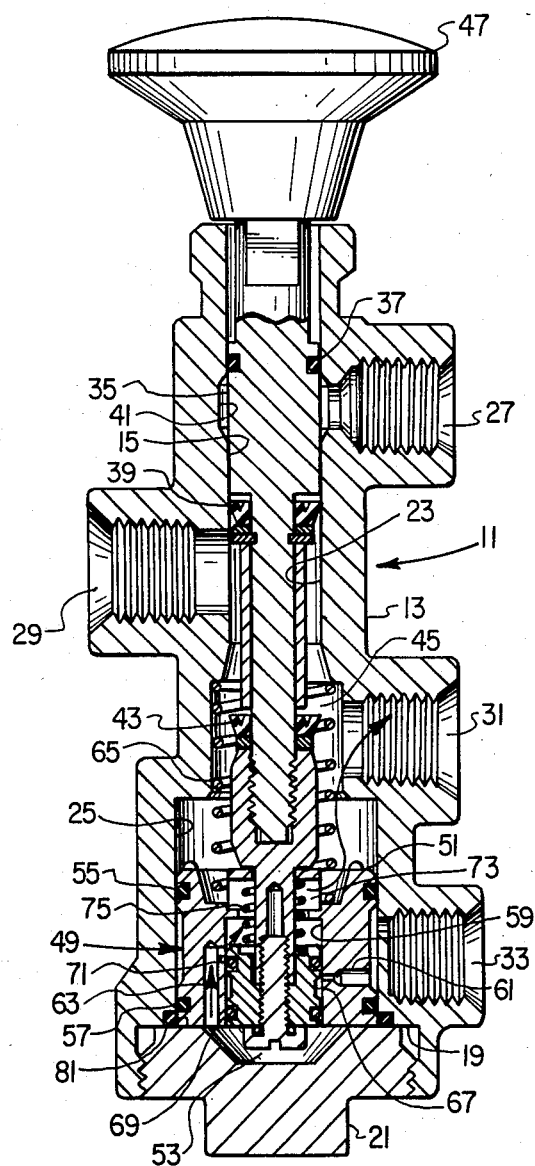
FIG. 2 is a longitudinal sectional view of the preferred embodiment of the relay valve of the present invention in the shut in or normal position.

Referring now to the drawings, and first to FIGS. 1 and 2, the relay valve of the present invention is designated generally by the numeral 11. Relay valve 11 includes a valve body 13 having a longitudinal valve bore 15 therethrough.

Valve bore 15 includes an open first end 17 and a second end 19 that is closed by an end cap 21. An O-ring seal 22 is provided to seal between end 19 and end cap 21. Valve bore 14 includes a first sealing bore portion 23 generally adjacent open end 17 and an enlarged diameter second sealing bore portion 25 generally adjacent second end 19.

Valve body 13 includes a plurality of axially spaced apart radially extending ports communicating with valve bore 15. The ports include an inlet 27, an outlet 29, an exhaust 31, and a pilot inlet 33. A valve stem 35 is axially movably positioned in valve bore 15 and is movable to perform the valving functions among inlet 27, outlet 29, and exhaust 31. An O-ring seal 37 is carried by stem 35 to sealingly engage first sealing bore portion 23 of valve bore 15 between inlet 27 and first end 17 of valve bore 15. A first cup seal 39 is carried by valve stem 35 to sealingly engage first sealing bore portion 23 of valve bore 15 to isolate outlet 29 from inlet 27 when relay valve 11 is in the shut in or normal position, as shown in FIG. 2. First cup seal 39 is positioned to reside in a radially enlarged portion 41 of valve bore 15 when valve stem 35 is in the in-service position to communicate inlet 27 with outlet 29, as shown in FIG. 1.

A second cup seal 43 is carried by valve stem 35 generally between outlet 29 and exhaust 31. Second cup seal 43 is positioned to sealingly engage first sealing bore 23 of valve bore 15 to isolate exhaust 31 from outlet 29 when valve stem 35 is in the in-service position, as shown in FIG. 1. Second cup seal 43 is disposed in a radially enlarged portion 45 of valve bore 15 to communicate outlet 29 with exhaust 31 when valve stem 35 is in the normal or shut in position, as shown in FIG. 2. Thus, when valve stem 35 is in the in-service position, as shown in FIG. 1, inlet 27 is communicated with outlet 29 and exhaust 31 is isolated from outlet 29. Conversely, when valve stem 35 is in the normal or shut in position, inlet 27 is isolated from outlet 29 and outlet 29 is communicated with exhaust 31.

Since cup seals generate greater frictional forces than do O-rings, first sealing bore portion 23 of valve bore 15 below inlet 27, which is engaged by cup seals 39 and 43, may have a slightly larger diameter than the portion of first sealing bore portion 23 above inlet 27, which is engaged by O-ring 37. Thus, the slightly greater frictional force generated by the cup seals is balanced by a slightly greater pressure force acting on the cup seals. The increase in diameter of first sealing bore portion 23 is selected so that the pressure and frictional forces are preferably balanced so that pressure at inlet 27 causes no movement of valve stem 35. Valve stem 35 includes a handle or knob 47 so that valve stem 35 may be easily manipulated between its in-service and shut in or normal positions.

The movement of valve stem 35 between its in-service and shut in or normal positions is operated and controlled by a piston and spool assembly designated generally by the numeral 49. Piston and spool assembly 49 include a piston 51 axially movably positioned in second sealing bore portion 25 of valve bore 15. Piston 51 cooperates with second sealing bore portion 25 and end cap 21 to form a chamber 53. A first piston seal 55 is carried by piston 51 in sealing engagement with second sealing bore portion 25 of valve bore 15 to isolate exhaust 31 from pilot inlet 33. A second piston seal 57 is carried by piston 51 in sealing engagement with second sealing bore portion 25 of valve bore 15 to isolate pilot inlet 33 from chamber 53. First piston seal 55 and second piston seal 57 have equal and opposed effective areas so that pressure from pilot inlet 33 in the space between piston seals 55 and 57 produces no net force on piston 51.

Piston 51 includes a longitudinal piston bore 59. A radially extending first passage 61 is formed in piston 51 to communicate piston bore 59 with the space between piston seals 55 and 57. A generally longitudinally extending second passage 63 is formed in piston 51 to communicate piston bore 59 with chamber 53. A piston spring 65 is disposed in the radially enlarged portion 45 of valve bore 15 intermediate first sealing bore portion 23 and second sealing bore portion 25 to urge piston 51 toward second end 19 and end cap 21.

Piston and spool assembly 49 includes a spool 67 connected to valve stem 35 and axially movably positioned in piston bore 59. Spool 67 carries a first spool seal 69 in sealing engagement with piston bore 59 to isolate first passage 61 of piston 51 from chamber 53. Spool 67 also carries a second spool seal 71 in sealing engagement with piston bore 59. Second spool seal 71 is movable with spool 67 between a closed position, as shown in FIG. 1, wherein passages 61 and 63 are communicated with each other through piston bore 59 and passage 63 is isolated from exhaust 31, and an open position, as shown in FIG. 2, in which passages 61 and 63 are isolated from each other and passage 63 is communicated with exhaust 31. Piston 51 includes a plurality of ports 73 to provide a flow path from passage 63 to exhaust 31. A spool spring 75 is positioned between piston 51 and spool 67 to urge spool 67 toward its open position.

When spool 67 is in the closed position, pressure from pilot inlet 33 communicates with chamber 53 through first passageway 61, piston bore 59 between spool seals 69 and 71, and second passage 63. Spool seals 69 and 71 have equal and opposed effective areas such that the pressure therebetween applies no net force to move spool 67.

Pressure in chamber 53 acts to urge spool 67 axially with respect to piston 51 to compress spool spring 75 and engage spool 67 with a stop 77 in piston bore 59. Pressure in chamber 53 also acts to urge piston 51 axially in second sealing bore portion 25 of valve bore 15 to compress piston spring 65. The force acting on piston spring 65 is equal to the pressure in chamber 53 multiplied by the combined effective areas of piston 51 and spool 67. The pressure in chamber 53 acts on the effective area of spool 67 to move and maintain valve stem 35 in the in-service position.

When spool 67 is in the open position, as shown in FIG. 2, chamber 53 is isolated from pilot inlet 33. Pressure at pilot inlet 33 acts only between piston seals 55 and 57 and spool seals 69 and 71. Since piston seals 55 and 57, on the one hand, and spool seals 69 and 71, on the other, have equal and opposed respective effective areas, pressure at pilot inlet 33 has no tendency to move either piston 51 or spool 67. Thus, valve stem 35 cannot be returned from the normal or shut in position to the in-service position unless valve stem 35 is manually pulled out to move spool 67 to the closed position. When stem 35 is in the shut in or normal position, piston 51 abuts a stop 81 formed by end cap 21 which limits the axial movement of piston 51 while allowing spool 67 to be fully open.

Figure 4:
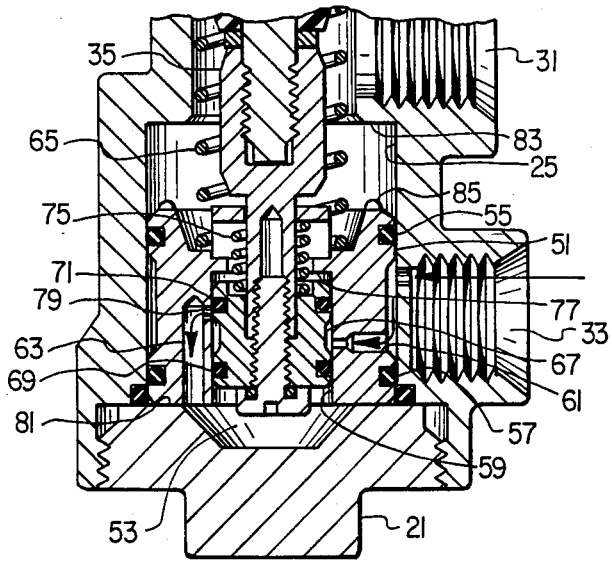
FIG. 4 is a partial longitudinal sectional view of the preferred embodiment of the relay valve of the present invention showing the operation of the valve in moving from the shut in position to the in-service position.

Referring to FIG. 4, there is illustrated the condition of relay valve 11 at the instant that spool 67 is moved to the closed position when stem 35 is otherwise in the normal or shut in position. Spool spring 75 has been compressed slightly and spool seal 71 has moved about the inlet 79 to second spool passage 63. Since spool spring 75 produces a smaller force than piston spring 65, piston 51 remains fully against the stop 81 formed by end cap 21. The pilot fluid at pilot inlet 33 begins to flow through passages 61 and 63 to pressurize chamber 53. Immediately after the instant depicted in FIG. 4, pressure in chamber 53 acts to urge spool 67 against stop 77. With spool 67 in the closed position, pressure acts on spool 67 and piston 51 to urge them outwardly, thereby moving stem 35 to the inservice position, as shown in FIG. 1. Piston 51 preferably includes a plurality of standoffs 85 to prevent piston 51 from sticking to upper stop 83.

Figure 3:
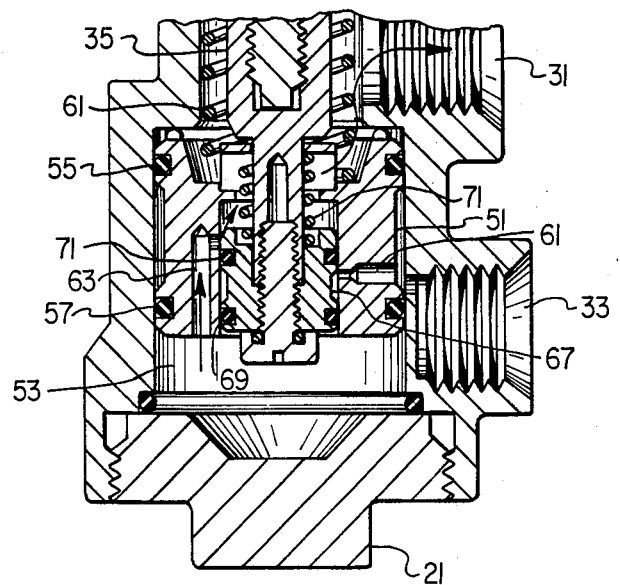
FIG. 3 is a partial longitudinal sectional view of the preferred embodiment of the relay valve of the present invention illustrating the operation of the valve in moving from the in-service position to the shut in position.

Referring to FIG. 3, there is illustrated the condition of relay valve 11 at the instant that spool 67 has moved to the open position, either by the manipulation of stem 35 or by a decrease in pressure at pilot inlet 33. The force required to move spool 67 to the open position is equal only to the pressure in chamber 53 multiplied by the effective area of spool 67, which is substantially less than the effective area of piston 51. Thus, in the case of manipulation of stem 35, a relatively small force may be applied to stem 35 to move spool 67 to the open position and thereby manually shut in relay valve 11. Spool spring 75 is selected to provide an opening force on spool 67 that is less than the force generated by the normally expected pressure at pilot inlet 33 but greater than some reduced pressure so that when pilot pressure drops below a selected value, spool 67 opens. Thus, upon a drop in pilot pressure, spool 67 moves quickly to the open position, simultaneously blocking communication between pilot inlet 33 and chamber 53 and allowing communication between chamber 53 and exhaust 31.

In FIG. 3, spool seal 71 has shifted to simultaneously isolate passage 61 from passage 63 and communicate chamber 53 with exhaust 31, thus allowing pressure to bleed from chamber 53. As pressure bleeds from chamber 53, spring 65 urges piston 51 toward end cap 21 and stem 35 moves to the normal or shut in position, as shown in FIG. 2. When spool 67 is open, pressure in chamber 53 can act on neither spool 67 nor piston 51. Thus, when spool 67 opens, either because of manipulation of stem 35 or because of a drop in pilot pressure, stem 35 moves quickly and positively to the normal or shut in position under the force of piston spring 65. Spool spring 75 maintains spool 67 in the open position. When stem 35 is in the normal or shut in position, a return of pilot pressure will not move stem 35 back to the in-service position. Stem 35 may be returned to the in-service position only by manually closing spool 67.

Relay valve 11 is particularly adapted for use in oil and gas well safety systems. In such systems, a source of valve actuator operating fluid, which may be either pneumatic or hydraulic, is connected to inlet 27 and outlet 29 is connected to the valve actuator. The system sensors are connected to pilot inlet 33 in the manner known to those skilled in the art. Since relay valve 11 may be operated manually to shut in with substantially less force than is required with heretofore existing relays, pilot pressure does not have to be regulated and the same source may be used for both actuator pressure and pilot pressure.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A relay valve, which comprises:
   a valve body having a longitudinal bore having a first end and a second end, said valve body having an inlet, an outlet, and exhaust, and a pilot inlet extending into said valve bore;
   a valve stem slidingly mounted in said valve bore and movable between a first position in which said inlet is in communication with said outlet and communication from said outlet to said exhaust is blocked, and a second position in which said outlet is in communication with said exhaust and communication from said inlet to said outlet is blocked;
   a piston slidingly mounted in said valve bore and movable with respect to said stem, said piston having a longitudinal piston bore, said piston defining a chamber in said valve bore between said piston and said second end of said valve bore;
   means for urging said piston toward said second end of said valve bore;
   a spool connected to said stem and slidingly positioned in said piston bore and movable with respect to said piston between an open position in which said chamber is in communication with said exhaust and a closed position in which communication between said chamber and said exhaust is blocked and said said pilot inlet is in communication with said chamber, wherein when said spool is in said closed position pressure within said chamber acts on said spool and piston to move said stem to said first position and when said spool is in said open position pressure in said chamber vents to said exhaust allowing said piston to move toward said second end of said valve bore allowing said stem to move to said second position;
   means for urging said spool toward said open position;
   and means for manually moving said spool to its open and closed positions.

2. The relay valve as claimed in claim 1, including means for blocking communication between said pilot inlet port and said chamber when said spool is in said open position.

3. The relay valve as claimed in claim 1, wherein:
   said pilot inlet intersects said valve bore intermediate said first and second and said piston includes;
   (a) a pair of axially spaced apart piston seals slidingly sealingly engaging said valve bore on axially opposite sides of said pilot inlet, said piston seals having equal and opposed effective areas;
   (b) a first passageway connecting said piston bore with the space in said valve bore between said seals;
   (c) a second passageway connecting said piston bore with said chamber, with the inlet of said second passageway to said piston bore being spaced axially apart from the inlet of said first passageway to said piston bore;
   and said relay valve includes spool seal means for communicating said first passageway with said second passageway when said spool is in one of said open or closed positions and blocking communication between said first and second passageways when said spool is in the other of said open or closed positions.

4. The relay valve as claimed in claim 3, wherein said spool seal means includse a first spool seal positioned between said second end of said valve body and said passageway inlets when said spool is in both said open and said closed positions, and a second spool seal positioned between said passageway inlets when said spool is in said open position and between said exhaust and said passageway inlets when said spool is in said closed position.

5. The relay valve as claimed in claim 1, wherein said pilot inlet intersects said valve bore intermediate said first and second ends.

6. The relay valve as claimed in claim 5 including seal means spaced apart on axially opposite sides of said pilot inlet for sealingly engaging said piston and said valve bore, said seal means having equal and opposed effective areas, whereby fluid pressure from said pilot inlet between said seal means applies no net force to said piston.

7. The relay valve as claimed in claim 6, wherein said piston includes first passage means for communicating said piston bore with the space between said piston seal means and second passage means for communicating said piston bore with said chamber, and said spool includes means for communicating said piston passage means with each other in one of said open or closed positions and isolating said passage means in the other of said open or closed positions.

8. The relay valve as claimed in claim 7, wherein said means for communicating said passage means with each other includes a pair of axially spaced apart spool seals each forming a sliding seal between said spool and said piston bore, said spool seals having equal and opposed effective areas, whereby pressure between said spool seals applies no net force to said spool.

9. The relay valve as claimed in claim 8, wherein one of said spool seals is positioned to block communication through said piston bore between said chamber and said passage means when said spool is in both said open and closed positions, and the other of said spool seals is carried by said spool and is positioned to isolate said piston passage means from each other when said spool is in said open position and to communicate said piston passage means with each other when said spool is in said closed position.

10. The relay valve as claimed in claim 1, wherein said means for moving said spool between said open and closed positions includes a handle connected to said stem and extending outwardly of said first end of said valve bore.

11. A relay valve, which comprises:
a valve body having a longitudinal valve bore having an open end and a closed end, said valve body having axially spaced apart along its length and intersecting said valve bore an inlet, an outlet, an exhaust, and a pilot inlet;
a valve stem slidingly mounted in said valve bore and movable between a first position in which said inlet is in communication with said outlet and said outlet is isolated from said exhaust, and a second position in which said said outlet is in communication with said exhaust and said inlet is isolated from said outlet;
a piston slidingly mounted in said valve bore, said piston having a longitudinal piston bore, and said piston defining a chamber within said valve bore between said piston and said closed end of said valve bore;
piston seal means spaced apart on axially opposite sides of said pilot inlet for forming a sealing engagement between said piston and said bore, one of said piston seal means isolating said pilot inlet from said exhaust and the other of said piston seal means isolating said pilot inlet from said chamber;
a first passage in said piston having an inlet in said piston bore and communicating said piston bore and the space between said piston seal means;
a second passage in said piston having an inlet in said piston bore and communicating said piston bore and said chamber;
means for urging said piston toward said closed end of said valve bore;
a spool connected to said valve stem and axially movably positioned in said piston bore, said spool being movable with respect to said piston between a closed position and an open position;
a first spool seal forming a sliding seal between said spool and said piston bore and positioned to isolate said chamber from said inlets of said passages;
a second spool seal carried by said spool and forming a sliding seal between said spool and said piston bore, said second spool seal being movable with said spool to communicate said inlets of said passages when said spool is in said closed position, thereby to communicate said pilot inlet with said chamber and isolate said chamber from said exhaust, and to isolate said inlets of said passages from each other when said spool is in said open position, thereby to isolate said chamber from said pilot inlet and communicate said chamber with said exhaust;
and means for urging said spool toward said open position.

12. The relay valve as claimed in claim 11, including means for limiting the movement of said piston toward said closed end of said valve bore.

13. The relay valve as claimed in claim 11, wherein:
said piston seal means have equal and opposed effective areas whereby pressure therebetween applies no net force to said piston;
and said first and second spool seals have equal and opposed effective areas whereby pressure therebetween applies no net force to said spool.

14. A relay valve which comprises:
a valve body having a longitudinal bore and an inlet, an outlet, an exhaust and a pilot inlet communicating with said bore;
a valve stem axially movably mounted in said bore and movable between a first position in which said inlet is in communication with said outlet and a second position in which said inlet is isolated from said outlet;
a piston axially movably mounted in said valve bore, said piston having a longitudinal piston bore therethrough, said piston defining a chamber in said valve bore for receiving pressure from said pilot inlet;
first piston seal means positioned between said piston and said valve bore for isolating said pilot inlet from said exhaust;
means for urging said piston toward said chamber;
a spool connected to said valve stem and axially movably positioned in said piston bore, said spool including a spool seal engageable with said piston, said spool being movable between a closed position in which said spool seal prevents communication between said chamber and said exhaust through said piston bore, and an open position in which said chamber is in communication with said exhaust through said piston bore, wherein when said spool is in said closed position pressure from said pilot inlet acts to urge said spool and piston outwardly of said chamber;

and means for urging said spool toward said open position.

15. The relay valve as claimed in claim 14, including means for limiting the movement of said piston toward said chamber.

16. The relay valve as claimed in claim 14, including means for isolating said chamber from said pilot inlet when said spool is in said open position.

17. The relay valve as claimed in claim 14, wherein said pilot inlet extends generally radially through said valve body to intersect said valve bore.

18. The relay valve as claimed in claim 17, including:

second piston seal means positioned between said piston and said valve bore for isolating said pilot inlet from said chamber, and wherein;

said piston includes a first passage having an inlet in said piston bore and communicating said piston bore with the space in said valve bore between said first and second piston seal means, and a second passage having an inlet in said piston bore and communicating said piston bore with said chamber, said passage inlets being axially spaced apart from each other;

said first spool seal is slidingly disposed in said piston bore and is positioned axially between said passage inlets and said spool is in said open position, and axially between said exhaust and said passage inlets when said spool is in said closed position;

and said relay valve includes a second spool seal sealing between said spool and said piston bore and positioned axially between said chamber and said passage inlets.

* * * * *